US008646763B2

(12) United States Patent
Cardone et al.

(10) Patent No.: US 8,646,763 B2
(45) Date of Patent: Feb. 11, 2014

(54) MOVABLE POLE EXTENSION FOR A MAGNETIC CLAMPING APPARATUS AND MAGNETIC CLAMPING APPARATUS HAVING SUCH MOVABLE POLE EXTENSION

(75) Inventors: Michele Cardone, Trezzano (IT); Giovanni Cosmai, Rescaldina (IT); Roberto Faranda, Milan (IT); Antonino Giglio, Pero (IT)

(73) Assignees: Tecnomagnete S.p.A., Lainate MI (IT); Politecnico di Milano, Milan (IT)

( * ) Notice: Subject to any disclaimer, the term of this patent is extended or adjusted under 35 U.S.C. 154(b) by 930 days.

(21) Appl. No.: 12/667,754

(22) PCT Filed: May 29, 2008

(86) PCT No.: PCT/IB2008/001477
§ 371 (c)(1),
(2), (4) Date: Jan. 5, 2010

(87) PCT Pub. No.: WO2009/007807
PCT Pub. Date: Jan. 15, 2009

(65) Prior Publication Data
US 2010/0187735 A1   Jul. 29, 2010

(30) Foreign Application Priority Data
Jul. 6, 2007   (IT) .............................. MI2007A1353

(51) Int. Cl.
  *B25B 11/00*   (2006.01)
  *B23Q 3/18*   (2006.01)
  *B25B 1/22*   (2006.01)
  *H01F 7/20*   (2006.01)
  *H01F 7/04*   (2006.01)

(52) U.S. Cl.
  USPC ........ 269/8; 269/55; 269/60; 269/71; 269/75; 335/285; 335/295

(58) Field of Classification Search
  USPC .............. 269/8, 55, 60, 71, 75; 335/285–287, 335/298
  See application file for complete search history.

(56) References Cited

U.S. PATENT DOCUMENTS 5,080,380 A * 1/1992 Nakagawa et al. ........... 279/128
5,090,648 A * 2/1992 Wood, IV .................. 248/125.3
(Continued)

FOREIGN PATENT DOCUMENTS

DE   1 032 441   6/1958
DE   1 096 795   1/1961
(Continued)

OTHER PUBLICATIONS

International Search Report for PCT/IB2008/001477, mailed Nov. 17, 2008.
Written Opinion of the International Searching Authority for PCT/IB2008/001477, mailed Nov. 17, 2008.

*Primary Examiner* — Lee D Wilson
*Assistant Examiner* — Nirvana Deonauth
(74) *Attorney, Agent, or Firm* — Nixon & Vanderhye, P.C.

(57) ABSTRACT

The present invention relates to a movable pole extension (4) for a magnetic clamping apparatus (1) for holding a ferromagnetic workpiece (P), comprising a fixed pole member (5) extending in a predetermined longitudinal direction (X-X) and at least two pole members (6, 7) attached to said fixed pole member (5), said at least two pole members (6, 7) being movable relative to said fixed pole member (5). The movable pole extension is characterized in that it has holder means (8) operably coupled to said fixed pole member (5), wherein said holder means (8) are movable in said predetermined longitudinal direction (X-X) between a first operating position (P1) and a second operating position (P2) and operate on said at least two movable pole members (6, 7) to hold them in coupled contact with said fixed pole member (5).

18 Claims, 7 Drawing Sheets

(56) References Cited

U.S. PATENT DOCUMENTS 6,012,711 A * 1/2000 Cipolla .......................... 269/21
2005/0269758 A1 * 12/2005 Sears et al. .................... 269/266

FOREIGN PATENT DOCUMENTS

| EP | 0 311 865 | 4/1989 |
|----|-----------|--------|
| EP | 0 559 483 | 9/1993 |

* cited by examiner

*Fig. 7A*

MOVABLE POLE EXTENSION FOR A MAGNETIC CLAMPING APPARATUS AND MAGNETIC CLAMPING APPARATUS HAVING SUCH MOVABLE POLE EXTENSION This application is the U.S. national phase of International Application No. PCT/IB2008/001477 filed 29 May 2008, which designated the U.S. and claims priority to Italy Application No. MI2007A001353 filed 6 Jul. 2007, the entire contents of each of which are hereby incorporated by reference.

The present invention relates to a movable pole extension for a magnetic clamping apparatus and a magnetic clamping apparatus having such movable pole extension as defined in the preambles of claims 1 and 19 respectively.

As used herein, the term magnetic clamping apparatus is intended to indicate:
- a permanent-magnet apparatus, i.e. an apparatus that does not require any power supply when used for clamping or for changing its state from active to inactive and vice versa, and is formed with permanent magnets in appropriate arrangement within the apparatus;
- an electro-permanent apparatus, i.e. an apparatus that does not require any power supply when used for clamping and requires power supply when it is activated and inactivated, and is formed with reversible permanent magnets and, if needed, with static permanent magnets in appropriate arrangement within the apparatus;
- an electromagnetic apparatus, i.e. an apparatus that requires power supply when used for clamping, whose magnetic core is made of ferromagnetic material.

Magnetic apparatus for clamping ferromagnetic workpieces are known to be required to clamp the workpiece without subjecting it to deformation either during machining and during activation of the apparatus.

Particularly, a deformation problem arises each time that the workpiece does not perfectly adhere against the clamping surface of the magnetic apparatus.

In most cases, workpieces are subjected to elastic deformation during clamping, due to the high force exerted by the magnetic apparatus and tend to recover their original shape as they are released therefrom, thereby impairing machining accuracy.

In an attempt to obviate the above drawback, movable pole extensions have been introduced, which can limit workpiece deformation by allowing the magnetic clamping surface to adapt to the workpiece.

An example of such movable pole extensions is disclosed in the Italian patent IT 1222875, by the applicant hereof, which is wholly incorporated herein by reference to describe the technical and operational features of a movable pole extension of the prior art.

Figure 1:
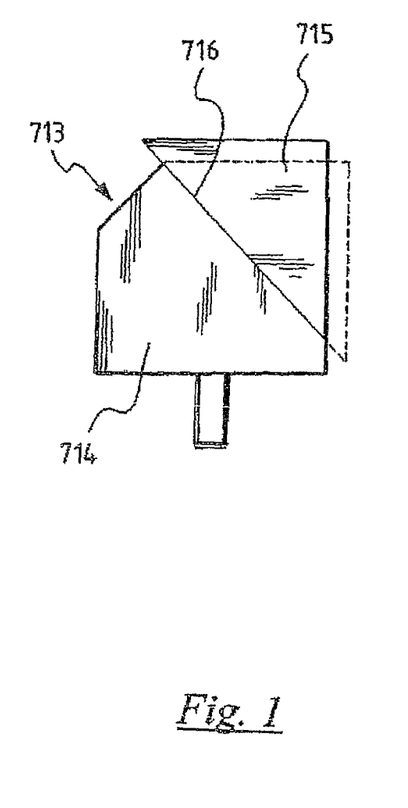
FIG. 1 is a side view of a prior art movable pole extension.

In view of the present disclosure it shall be recalled, also with reference to FIG. 1, which shows a side view of a pole extension of the prior art, that the inclination of the sliding surface 716 allows the movable part 715 to be displaced partly in the direction of the axis of the fixed part 714, i.e. orthogonal to the reference surface of the apparatus and partly lateral to the movable part 715 itself.

Once the magnetic apparatus (not shown in this figure) is activated, the movable parts of the pole extensions 713 will conform to the shape of the workpiece (not shown in this figure) and be magnetically locked in their position, thereby preventing any vertical or horizontal displacement of the workpiece.

This occurs both due to the considerable magnetic attractive force between the fixed part 714 and the movable part 715, exerted by the magnetic apparatus and due to the joint and combined action of the various sliding surfaces of the extensions, when these are arranged opposite to each other.

Nonetheless, while the movable pole extensions as disclosed in the above mentioned patent IT 1222875 provide undisputable advantages, they still suffer from certain drawbacks, such as the following:
- part of the magnetic flux leaks from the pole extension as the magnetic apparatus is activated;
- the sliding displacement of two complementary parts over an inclined surface, e.g. having a 45° inclination, reduces the contact area between the movable and fixed parts of the pole extension as the stroke increases and reduces the amount of magnetic flux that can be used for workpiece clamping;
- the sliding motion of the movable member of the pole extension over an inclined surface, e.g. having a 45° inclination, may interfere with other workpieces lying on the clamping plate;
- the provision of one inclined surface for each pole extension, e.g. having a 45° inclination, requires the pole extensions to be suitably oriented in view of opposing the various sliding surfaces, and this involves that the direction of the inclined surface of a movable pole extension relative to the direction of the surface of the adjacent movable pole extension shall be accounted for;
- the fixation of the movable pole extension to the magnetic plate is complex and time-consuming, requiring holes to be formed in the extension, as well as a given number of steps for fastening the movable pole extension to the magnetic plate, which increases manufacturing costs;
- the use of movable pole extensions with an inclined surface, e.g. having a 45° inclination, requires pole extensions to be of greater height, under the same magnetic pole member size conditions.

In view of the above prior art, the object of the present invention is to obviate the above mentioned drawbacks of prior art pole extensions.

According to the present invention, this object is fulfilled by a movable pole extension for a magnetic clamping apparatus and a magnetic clamping apparatus having such movable pole extension as defined in the preambles of claims 1 and 18 respectively.

The present invention provides a movable pole extension for use in magnetic clamping apparatuses for holding workpieces to be machined and/or lifted, that can automatically conform to the area of the workpieces to be clamped, while allowing extensive magnetic flux circulation, to minimize leakages and ensure firm workpiece holding.

Particularly, the present invention allows removal of the gaps between the movable pole extension and the workpiece, thereby optimizing magnetic flux circulation, and achieving up to 40% increase of the clamping force as compared with a traditional movable extension of equal size.

Furthermore, with the present invention mutual orientation of the movable pole extensions is no longer required.

The inventive features of the movable pole extensions also prevent any ingress of dirt, such as chips, etc. and consequent operation impairment.

The movable pole extension of the present invention has a smaller height dimension than pole extensions formed with a inclined surface, which increases their versatility.

Also, their circular conformation greatly simplifies fixation of the movable pole extension to the clamping plate of the magnetic apparatus, by avoiding the use of specific tools for fastening the extension to the plate.

The characteristics and advantages of the invention will appear from the following detailed description of one practical embodiment, which is illustrated without limitation in the annexed drawings, in which.

Figure 2:
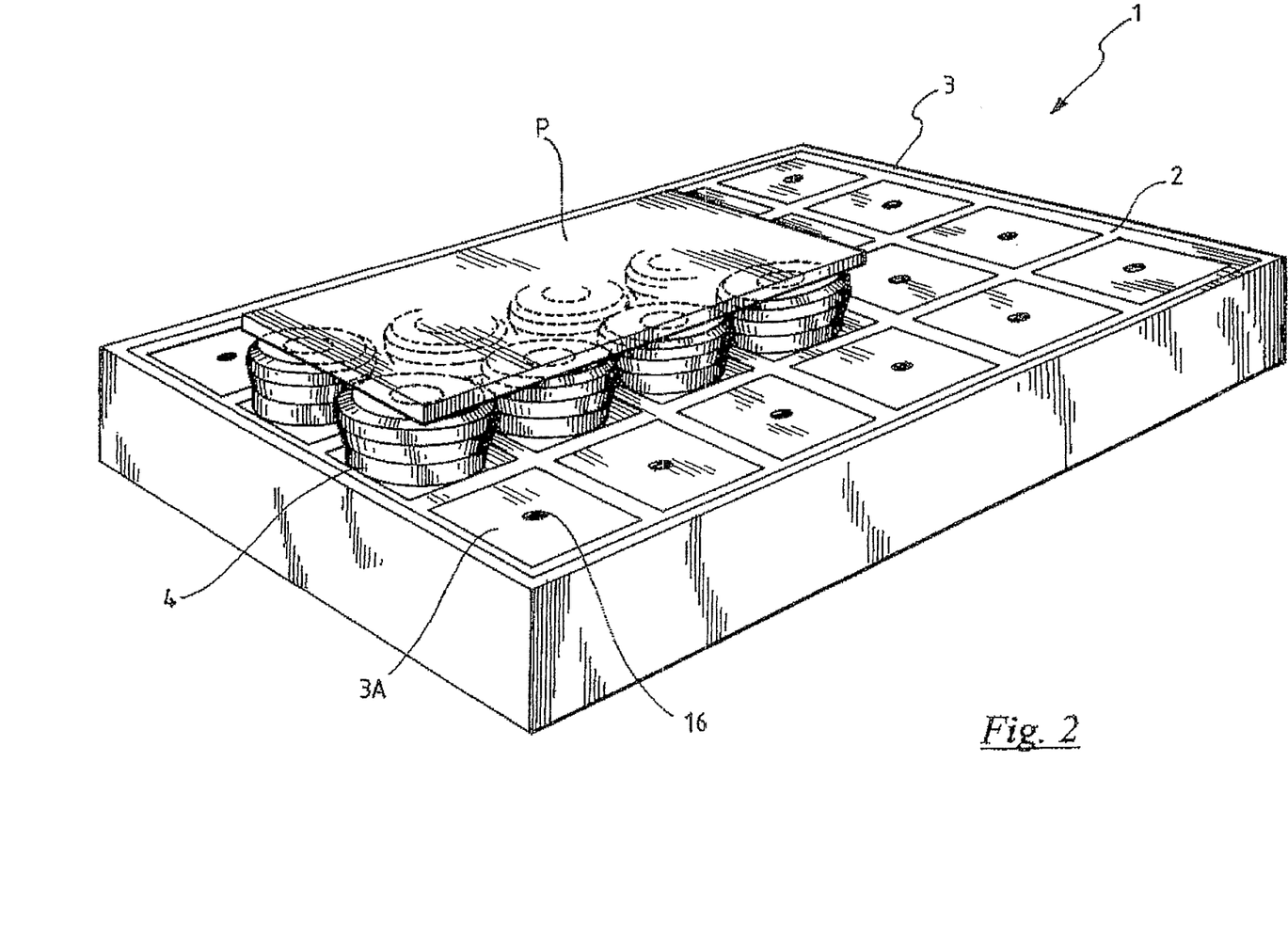
FIG. 2 is a perspective view of a magnetic clamping apparatus having pole extensions as disclosed in the present invention.

Referring now to FIG. 2, there is shown a perspective view of a magnetic clamping apparatus 1, such as an electro-permanent apparatus as mentioned above, whose operation is well known to those of ordinary skill in the art and will not be further described herein.

This magnetic clamping apparatus 1 has a magnetic surface defined by a clamping plate 2.

This clamping plate 2 is equipped with a plurality of pole pieces 3, e.g. having a square section, which are activated and inactivated by a magnetic circuit that is known in the art and will not be further described herein.

Certain pole pieces 3A of this plurality of pole pieces 3 may be mechanically associated with respective movable pole extensions 4, as explained in greater detail hereinbefore.

Each movable pole extension 4 allows support and clamping of a ferromagnetic workpiece P which shall be, for instance, submitted to mechanical machining (not shown) by a machine tool, such as a miller or similar machines.

As shown in FIGS. 3 to 7C, each movable pole extension 4 comprises:

a fixed pole member 5 extending in a predetermined longitudinal direction X-X, at least two pole members 6 and 7 coupled to said fixed pole member 5, where the at least two pole members 6 and 7 are movable relative to said fixed pole member and holder means 8.

Figure 6A:
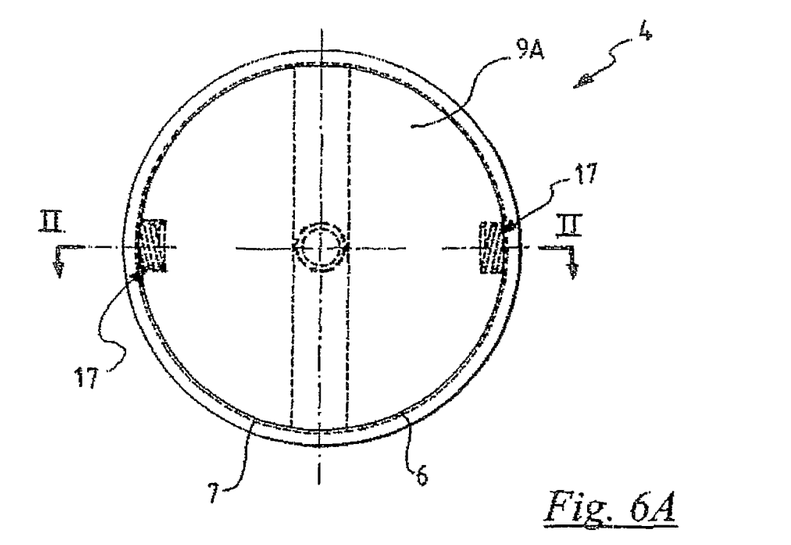
FIGS. 6A and 6B are a top plan view and a sectional view taken along line II-II of FIG. 6A respectively of a second embodiment of the movable pole extension of the present invention.
Figure 6B:
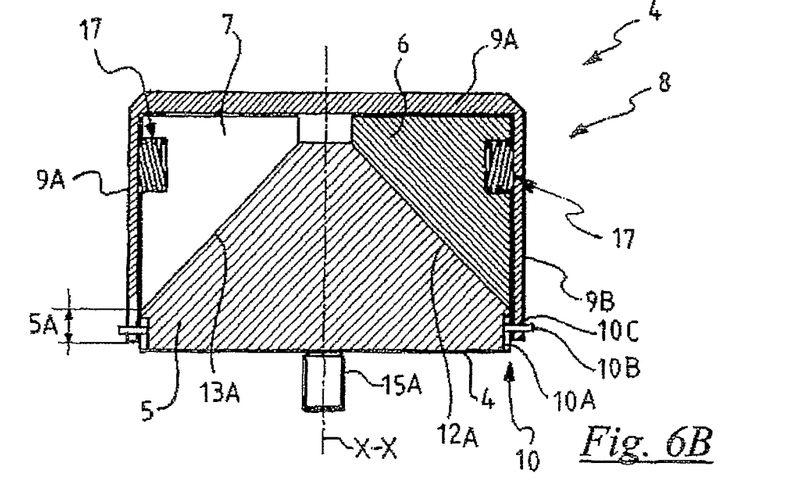

Particularly, the holder means 8 are movable in said predetermined longitudinal direction X-X between a first operating position P1 (FIGS. 4A, 6A) and a second operating position P2 (FIGS. 4B, 6B).

As better explained hereinafter, the holder means 8 and the at least two movable pole members 6 and 7 are movable, between the first operating position P1 and the second operating position P2 in various different directions.

For example, if the fixed element 5 extends in a longitudinal direction X-X perpendicular to the surface of the clamping plate 2 of the magnetic apparatus 1, then the holder means 8 for containing each movable pole member 4 may move axially in said longitudinal direction X-X, whereas the at least two movable pole members 6 and 7 may move in directions inclined to said predetermined longitudinal direction X-X, to form a predetermined angle of inclination.

In other words, the at least two movable pole members 6, 7 may move each in directions other than the predetermined longitudinal direction X-X in which said holder means 8 move.

The at least two movable members 6 and 7 and the fixed pole member 5 are coupled by a surface contact form fit between complementary profiles.

Advantageously, the holder means 8 are operably attached to the fixed pole member 5.

It shall be noted that the holder means 8 operate on said at least two movable pole members 6 and 7 to hold them in mating contact with said fixed pole member 5.

Furthermore, this mating contact provides high magnetic flux circulation, once the magnetic apparatus has been activated, to minimize magnetic leakage while ensuring firm clamping of the workpiece P.

Therefore, the holder means 8 define a magnetic surface that is able to move between said first operating position P1 and said second operating position P2 and are also able to convey part of the magnetic flux from the magnetic pole member 3A of the magnetic surface 3, by acting as magnetic flux collector, to increase the magnetic performance of the movable pole extension 4.

The holder means 8 have the following characteristics:

they are movable in said predetermined longitudinal direction X-X between a first operating position P1 (FIGS. 4A, 6A) and a second operating position P2 (FIGS. 4B, 6B);

they act as collectors of part of the magnetic flux from the magnetic pole member 3A of the magnetic surface 3;

they operate on said at least two movable pole members 6 and 7 to hold them in mating contact with said fixed pole member 5.

In other words, the holder means 8 are movable pole member holder means.

Advantageously, the holder means 8 comprise a hollow member 9 in slideable mating relationship with said fixed pole member 5, said hollow member 9 being able to hold at least one portion 5A of said fixed pole member 5 by a form fit between complementary profiles, and to contain said at least two movable pole members 6 and 7.

Particularly, the hollow member 9 comprises an end wall 9A with side walls 9B extending therefrom in said longitudinal direction X-X to contain said at least one portion 5A of said fixed pole member 5.

Figure 3:
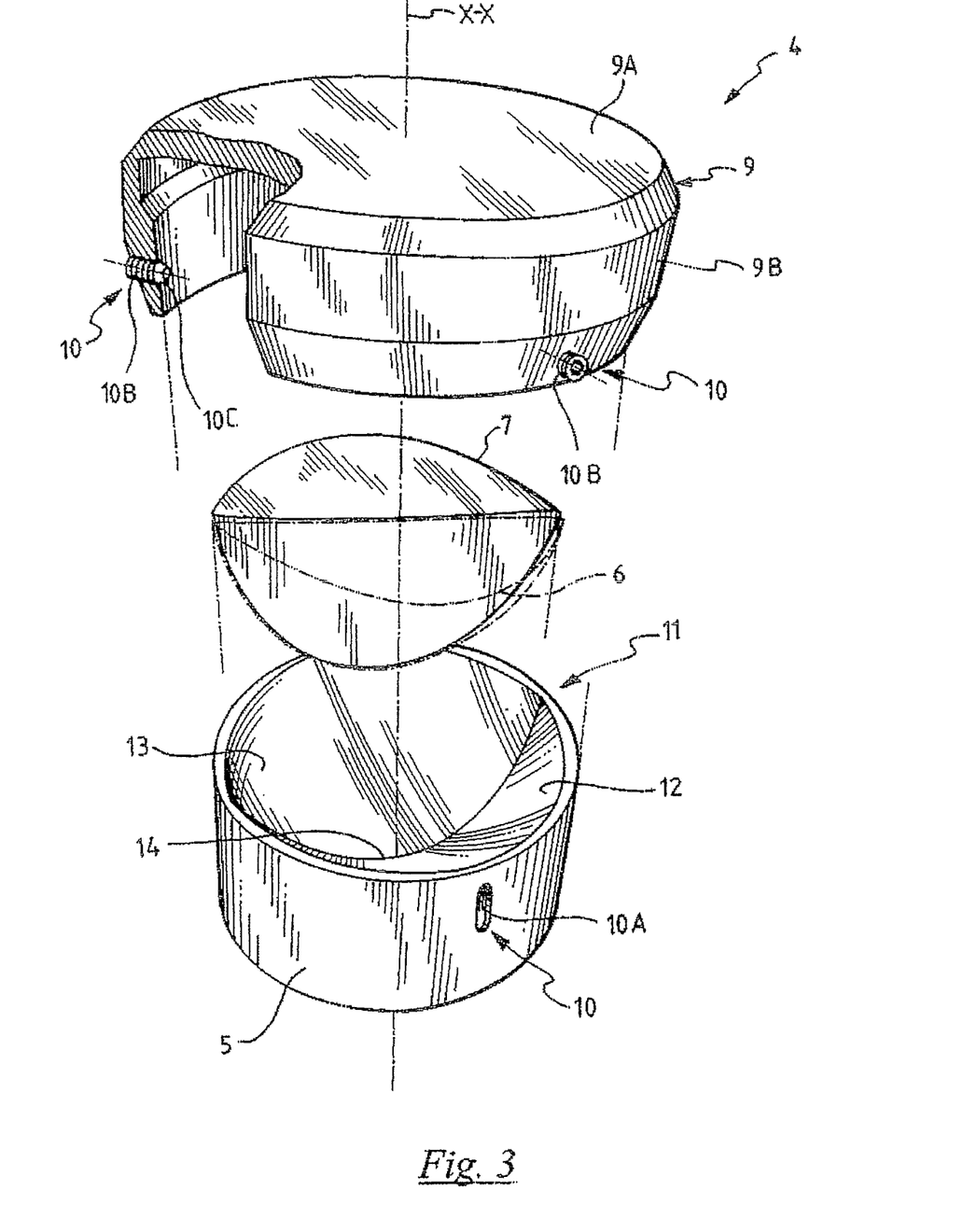
FIGS. 3 and 4 are exploded views of a first embodiment of a movable pole extension as disclosed in the present invention.
Figure 4:
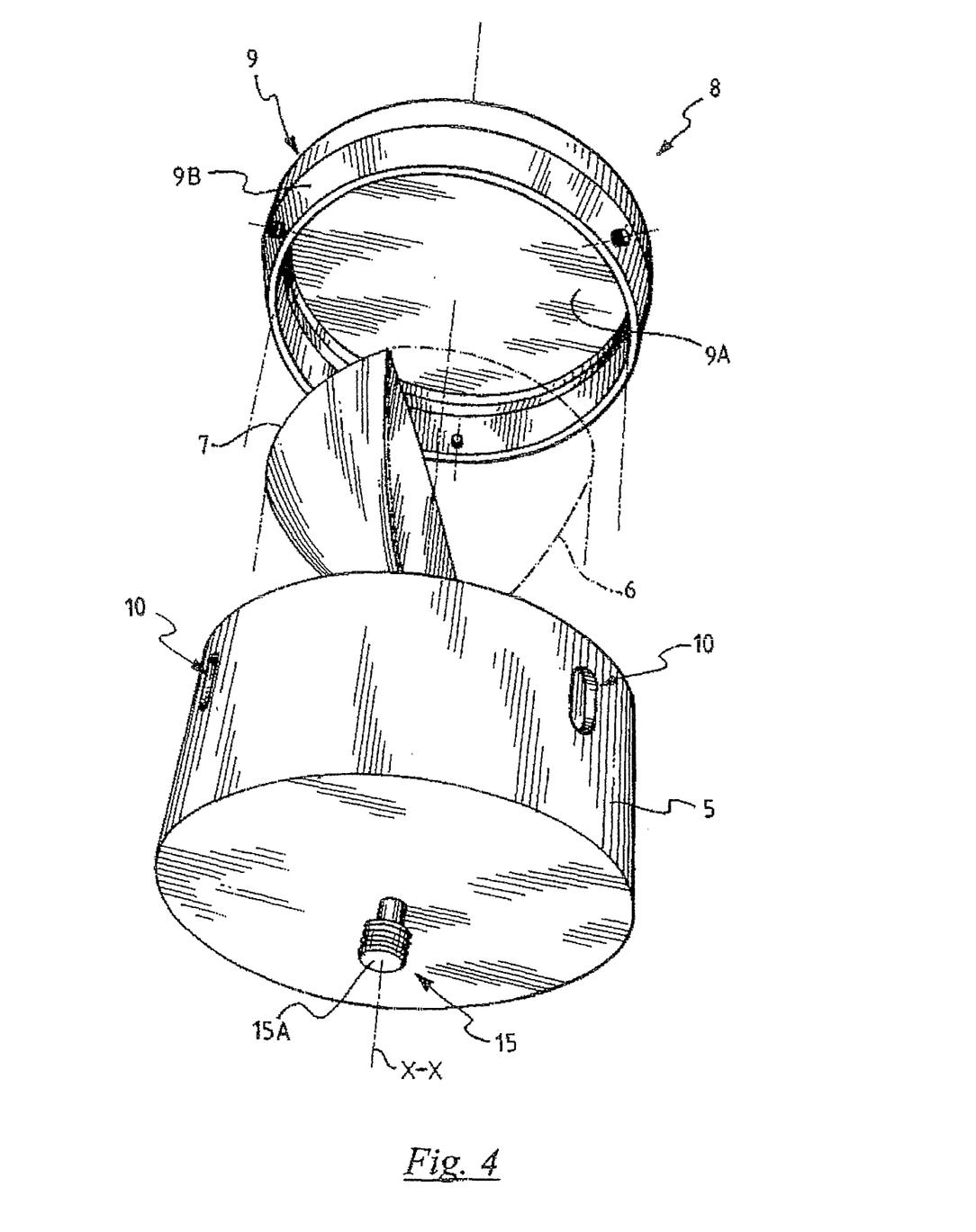

The end wall 9A, as specially shown in FIGS. 3 and 4, acts as a bearing surface when the workpiece P lies on the movable pole extension 4.

Otherwise, the end wall 9A of the hollow member 9 may be formed with such a shape as to mate with the surface of the workpiece P if such workpiece P has a non-planar surface.

Abutment means 10 are provided to restrict the stroke of the hollow member 9 relative to the fixed pole member 5 between the first operating position P1 and the second operating position P2, which means consist of a combination of a slot 10A opening parallel to said longitudinal direction X-X into the outer surface of the fixed pole member 5 and a guide pin 10B that is designed to slide within the slot 10A, after passing through a hole 10C formed in the side wall 9B of the hollow member 9, said hole 10C facing towards said slot 10A.

The abutment means 10 constrain the holder means 8 between the first operating position P1 and the second operating position P2, due to the sliding motion of the guide pin 10B in the slot 10A.

Particularly, the slot 10A delimits the top (position P1) and the bottom (position P2) of the stroke covered by the holder means 8.

Those skilled in the art may obviously envisage other types of abutment means that are structurally and/or functionally equivalent to the above mentioned combination of the slot 10A, the guide pin 10B and the hole 10C.

It shall be further noted that the bottom of the fixed pole member 5 is equipped with fastener means 15 for mechanical fixation to the magnetic pole member 3A of the clamping plate 2 of the magnetic apparatus 1.

These fastener means 15 consist, for instance, of a screw 15A mating with a corresponding threaded hole 16 formed in the pole pieces 3A of the magnetic apparatus 1.

Those skilled in the art may obviously envisage other types of fastener means that are structurally and/or functionally equivalent to the above mentioned combination of the screw 15A and threaded hole 16.

The materials that form the fixed pole member 5, the two pole members 6 and 7 and the holder means 8 are preferably ferromagnetic materials.

Referring now to FIGS. 3 to 5C, there is shown a first embodiment of the present inventions, in which the fixed pole member 5 is shown to have a circular plan shape.

The holder means 8 also have a circular plan shape and thence can contain at least one portion 5A of said fixed pole member 5 by form fit between complementary profiles.

Here, the holder means 8 consist of a hollow cylindrical container whose end wall 9A has a flat surface for supporting the ferromagnetic workpieces P, which is parallel to the clamping surface of the magnetic apparatus, and whose side wall 9B contains at least one portion 5A of said fixed pole member 5.

Figures 5A, 5C:
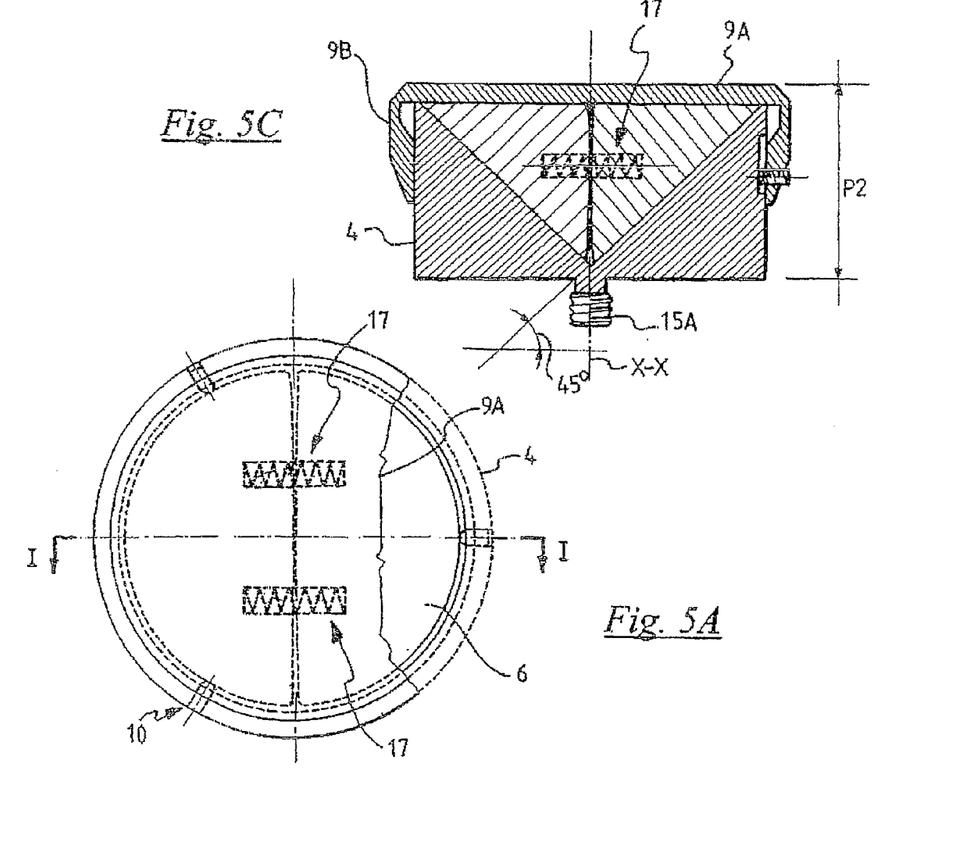
FIG. 5A is a top plan view of the movable pole extension of FIGS. 3 and 4.
FIGS. 5B and 5C are respective sectional views of the movable pole extension taken along line I-I of FIG. 5A, particularly FIG. 5B with the movable pole extension in a first operating position and FIG. 5C with the movable pole extension in a second operating position.
Figure 5B:
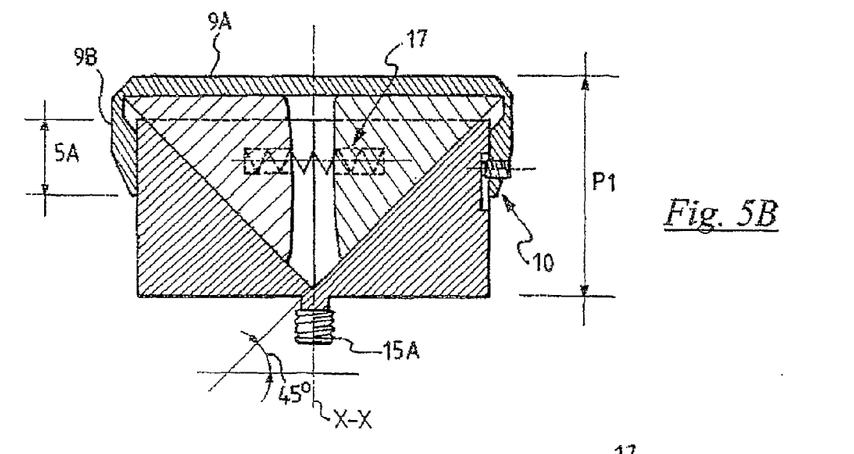

The hollow cylindrical container is free to move in the predetermined longitudinal direction X-X between the first operating position P1 (FIG. 5A) and the second operating position P2 (FIG. 5B).

Therefore, when the hollow cylindrical container is in the first operating position P1, then the movable pole extension 4 will be in the maximum extension state, whereas when the hollow cylindrical container is in the second operating position P2, then the movable pole extension 4 is in the minimum extension state.

It shall be noted that the holder means 8 may be movable in the longitudinal direction X-X because the fixed pole member 5 has a receptacle 11 that defines at least two surfaces 12 and 13, which provide a surface contact form fit between complementary profiles with the at least two movable members 6 and 7.

Advantageously, the at least two movable pole members 6 and 7 are in slideable mating contact with one of said at least two surfaces 12 and 13 respectively.

This feature minimizes flux leakage and magnetic force reduction caused by the movable pole extension 4, due to the lack of gaps.

It shall be noted that the two surfaces 12 and 13 are preferably oriented in opposite directions and converge towards the bottom 14. These surfaces may be identified by curved surfaces such as second order algebraic surfaces, also known as quadric surfaces.

Particularly, the surfaces 12 and 13 are obtained by special machining to obtain a profile mating the surfaces of the movable pole members 6 and 7.

In this preferred embodiment of the present invention, special machining of the receptacle 11 of the fixed pole member 5 allows the at least two second order algebraic surfaces 12 and 13 to have a substantially cylindrical shape.

In this case, also referring to FIGS. 3 and 4, the generators of these cylindrical surfaces 12 and 13 form an angle of 40° to 50°, preferably of 45° relative to the predetermined longitudinal direction X-X.

Therefore, the two cylindrical surfaces 12 and 13 form the receptacle along which the movable pole members 6 and 7 can slide, so that the holder means 8 are also allowed to move between said first operating position P1 and said second operating position P2.

In other words, the movable pole members 6 and 7 slide in a direction that is inclined to said longitudinal direction X-X, at an angle of 40° to 50°, preferably 45°, whereas the holder means 8 move orthogonal to the clamping plate 2 between the first operating position P1 (FIG. 5A) and the second operating position P2 (FIG. 5B).

Advantageously, the special embodiment that is shown in the annexed figures provides a movable pole extension of smaller height as compared with prior art extensions, and this increases the useful height of the machine tool.

It shall be noted that when the movable pole extension 4 is in the minimum extension state (P2), then the movable pole members 6 and 7 are held within the receptacle 11 formed in the fixed pole member 5.

While two curved surfaces 12 and 13 are only shown herein, it shall be intended that the receptacle 11 may define a plurality of curved surfaces according to special design requirements.

As shown in FIGS. 5A, 5B and 5C, elastic means 17 are also optionally provided, which operate on the two movable pole members 6 and 7 to hold said two movable pole members 6 and 7 in contact with the two surfaces 12 and 13 of said fixed pole member 5 and to hold the holder means 7 in the first operating position P1, i.e. the maximum extension position of the movable pole extension 4.

Particularly, the elastic means 17 include at least one spring interposed between said at least two movable pole members 6 and 7.

In the embodiment as shown in FIGS. 5A, 5B and 5C two springs are provided, for better adhesion of the movable members 6 and 7 to the cylindrical surfaces 12 and 13.

In this first embodiment, the abutment means 10 consist of three slots 10A, opening parallel to said longitudinal direction X-X into the outer surface of the fixed pole member 5 and three respective guide pins 10B, each sliding in a respective slot 10A, such pins passing through respective holes 10C formed in the side wall 9B of the hollow member 9, each hole 10C facing towards its respective slot 10A.

Referring now to FIGS. 6A and 6B, there is shown a second embodiment of the present invention, differing from the first embodiment in that the at least two inclined surfaces 12A and 13A of the fixed pole member 5 have different inclinations relative to the predetermined longitudinal direction X-X.

Particularly, the two inclined surfaces 12A and 13A define respective sliding surfaces for the at least two movable pole members 6 and 7, each of the latter being in slideable mating contact with a respective surface of said fixed pole member 5.

Advantageously, the respective inclined surfaces 12A and 13A are oriented opposite to each other, e.g. each of these respective inclined sliding surfaces forms an angle of 40° to 50°, preferably 45°, relative to said predetermined longitudinal direction X-X.

In other words, the movable pole members 6 and 7 slide in a direction that is inclined to said longitudinal direction X-X, at an angle of 40° to 50°, preferably 45°, whereas the holder means 8 move orthogonal to the clamping plate 2.

It shall be noted that, once more in this second embodiment, if elastic means 17 are designed to operate on the two movable pole members 6 and 7 to hold said at least two movable pole members 6 and 7 in contact with the inclined surfaces 12A and 13A of the fixed pole member 5, then these elastic means 17 include at least one spring interposed between said at least two movable pole members 6 and 7.

Preferably, there will be one spring for each movable pole member 6 and/or 7, to be interposed between the fixed pole member 5 and the movable pole member 6 and/or 7.

Figure 7A:
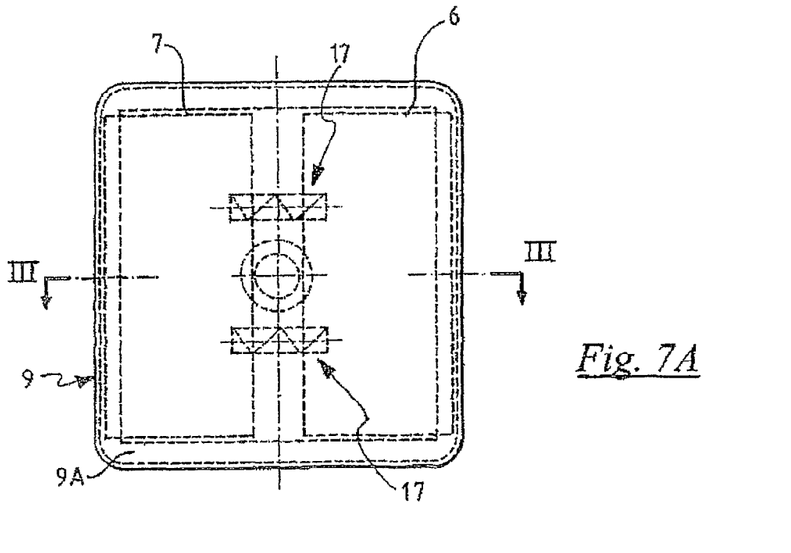
FIG. 7A is a top plan view of a third embodiment of a movable pole extension of the present invention.
Figure 7B:
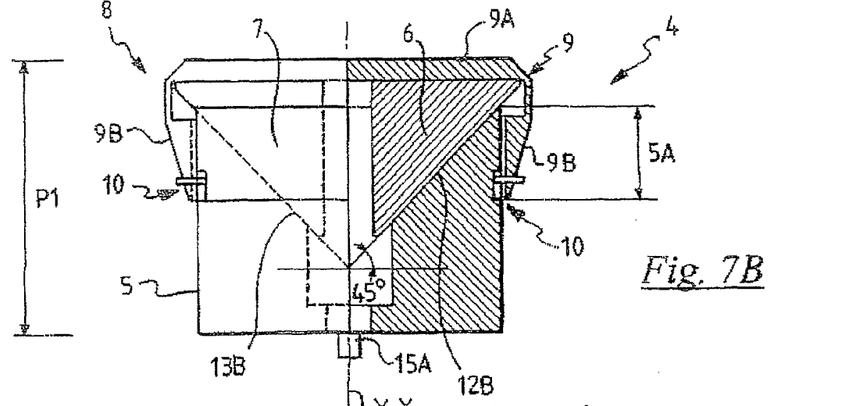
FIGS. 7B and 7C are respective sectional views of the movable pole extension taken along line III-III of FIG. 7A, particularly FIG. 7B with the movable pole extension in a first operating position and FIG. 7C with the movable pole extension in a second operating position.
Figure 7C:
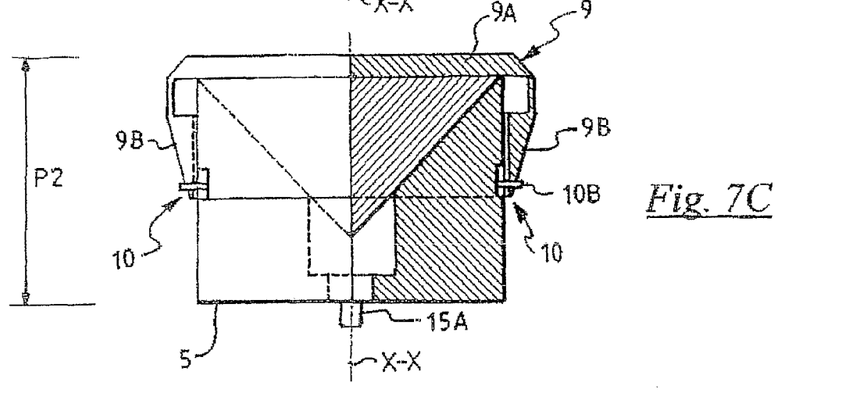

Referring now to FIGS. 7A to 7C, there is shown a third embodiment of the present invention, differing from the first and the second embodiment in that the pole extension 4 has a quadrangular shape.

Particularly, both the fixed pole member 5 and the holder means 8 have a quadrangular plan shape. These have the same size as the surface of the pole piece of the magnetic apparatus 1 with which the pole extension 4 is associated, thereby ensuring a continuous magnetic flux conduction section, while minimizing the causes for flux leakage and magnetic force reduction.

In this particular embodiment, the fixed pole member 5 still includes the at least two surfaces 12B and 13B inclined to the predetermined longitudinal direction X-X.

Particularly, the two inclined surfaces 12B and 13B define respective sliding surfaces for the at least two movable pole members 6 and 7, each of the latter being in slideable mating contact with a respective surface 12B and 13B of said fixed pole member 5.

Advantageously, the respective inclined surfaces 12B and 13B are oriented opposite to each other, e.g. each of these respective inclined sliding surfaces forms an angle of 40° to 50°, preferably 45°, relative to said predetermined longitudinal direction X-X.

In other words, the movable pole members 6 and 7 slide in a direction that is inclined to said longitudinal direction X-X, at an angle of 40° to 50°, preferably 45°, whereas the holder means 8 move orthogonal to the clamping plate 2.

It shall be noted that, once more in the third embodiment the holder means 8 consist of a hollow parallelepipedal container that is free to move in the predetermined longitudinal direction X-X between the first operating position P1 (FIG. 7B) and the second operating position P2 (FIG. 7C).

As an alternative to the above, in any one of the previously described embodiments the fixed pole member 5 and the holder means 8 may have a polygonal (hexagonal, octagonal, etc.) shape, an elliptic shape or a polygonal shape with rounded corners.

Concerning the operation of the magnetic apparatus 1 with the above mentioned pole extensions 4, the end wall 9A of the hollow member 9, in response to the action of the elastic means 17 shall be first in the operating position P1, in which the movable pole extension 4 is in its maximum extension state.

When the workpiece P is laid on the pole extensions 4, the holder means 8 move in the predetermined longitudinal direction X-X, under the weight of the workpiece P, from the first operating position P1 down to an intermediate location between the first operating position P1 and the second operating position P2, or abut into the second operating position P2.

Since the holder means 8 of each movable pole extension 4 can move in the longitudinal direction X-X independently of the fixed pole member 5, each movable pole extension 4 can change its height, wherefore the distance between the surface on which the workpiece is laid P and the clamping plate 2 of the magnetic apparatus 1 may change according to the existing deformation of the workpiece P.

The use of multiple pole extensions as described above, either of circular or square plan shape, which are associated with the magnetic apparatus 1 by securing the screw 15A in the corresponding threaded hole 16 provides a workpiece P clamping plate made up of the surfaces of all the pole extensions, that can automatically conform to the shape of the workpiece P to be clamped. When the pole extensions are equipped with elastic elements 17 designed to hold the hollow member 9 in the maximum allowed extension state, this shape conformation occurs with the magnetic apparatus 1 still inactivated.

The arrangement of the movable pole members 6 and 7 relative to the fixed pole member 5 of each movable pole extension 4 allows the movable pole holder means 8 to move in the direction of axis X-X, i.e. orthogonal to the clamping surface 2 of the magnetic apparatus 1.

As the magnetic apparatus 1 is activated, all the movable pole extensions 4, with the movable pole holder means 8 already adapted to the shape and weight of the workpiece P, will be locked in their position, thereby preventing any vertical or horizontal displacement of the workpiece P.

It shall be noted that the continuous and consistent contact of the workpiece P, the holder means 8, the movable pole members 6 and 7, the fixed pole member 5 and the magnetic pole 3A allows minimization of the gaps and magnetic flux leakage, the magnetic flux being thus usefully conveyed to the workpiece P being clamped.

This will ensure high clamping forces as well as a highly reliable operation of the pole extension 4, without requiring any increase of the magnetomotive force in the magnetic surface of the relevant apparatus.

The above pole extensions may be advantageously employed in upright or upturned positions even on magnetic lifting or handling apparatus.

If the pole extensions are used in upturned positions, then the holder means 8 will be in the maximum extension state even without the provision of elastic means 17, the weight of all movable members being sufficient to cause their downward sliding motion.

As the workpiece P to be lifted is laid thereon, the holder means 8 of the movable pole extension 4 will tend to move back to the extent required for compensating for the local deformation of the workpiece P. Thus, all the movable pole extensions 4 will form a clamping surface adapted to conform to the workpiece P, all the relevant pole extensions being in direct contact with the workpiece P.

Once the magnetic apparatus is activated, the holder means 8 and the movable pole members 6 and 7 of each pole extension 4 will be locked in their relative positions, as mentioned above, thereby firmly holding the workpiece to be lifted.

Those skilled in the art will obviously appreciate that a number of changes and variants may be made to the arrangements as described hereinbefore to meet specific needs, without departure from the scope of the invention, as defined in the following claims.

The invention claimed is:

1. A movable pole extension for a magnetic clamping apparatus (1) for holding a ferromagnetic workpiece (P), comprising:
   a fixed pole member (5) extending in a predetermined longitudinal direction (X-X) and
   at least two pole members (6, 7) coupled to said fixed pole member (5), said at least two pole members (6, 7) being movable relative to said fixed pole member (5), holder means (8) operably coupled to said fixed pole member (5), wherein said holder means (8):
  are movable in said predetermined longitudinal direction (X-X) between a first operating position (P1) and a second operating position (P2) and
  operate on said at least two movable pole members (6, 7) to hold them in mating contact with said fixed pole member (5);
  wherein said holder means (8) include a hollow member (9) in slidably mating relationship with said fixed pole member (5), said hollow member (9) being able to hold at least one portion (5A) of said fixed pole member (5) by a form fit between complementary profiles;
  wherein said hollow member (9) comprises an end wall (9A) with side walls (9B) extending therefrom in said longitudinal direction (X-X) to contain said at least one portion (5A) of said fixed pole member (5).

2. The movable pole extension as claimed in claim 1, wherein said at least two movable pole members (6, 7) are each movable in different directions relative to said predetermined longitudinal direction (X-X).

3. The movable pole extension as claimed in claim 1, further comprising an abutment means (10) for urging said holder means (8) to slide in said longitudinal direction (X-X) between said first operating position (P1) and said second operating position (P2), thereby limiting the stroke of said holder means (8) relative to said fixed pole member (5).

4. The movable pole extension as claimed in claim 1, wherein said fixed pole member (5) has a receptacle (11) that defines at least two curved surfaces (12, 13) relative to said predetermined longitudinal direction (X-X) and a bottom (14), said at least two movable pole members (6, 7) being each in slidably mating contact with one respective surface of said at least two surfaces (12, 13).

5. The movable pole extension as claimed in claim 4, wherein said at least two curved surfaces (12, 13) are oriented in opposite directions, converging towards said bottom (14).

6. The movable pole extension as claimed in claim 1, further comprising elastic means (17) operating on said at least two movable pole members (6, 7) for holding said at least two movable pole members (6, 7) in contact with said fixed pole member (5).

7. The movable pole extension as claimed in claim 6 wherein said elastic means (17) include at least one spring interposed between said at least two movable pole members (6, 7) and said fixed pole member (5).

8. The movable pole extension as claimed in claim 1, wherein said fixed pole member (5) has fastener means (15) for fixation thereof to a clamping plate (2) of said magnetic clamping apparatus (1).

9. The movable pole extension as claimed in claim 1, wherein said holder means (8) and said fixed pole member (5) have a circular plan shape.

10. The movable pole extension as claimed in claim 1, wherein said holder means (8) and said fixed pole member (5) have a polygonal or elliptic plan shape or a polygonal shape with rounded corners.

11. A magnetic clamping apparatus comprising:
  a frame adapted to contain a plurality of pole pieces, each of said plurality of pole pieces having a ferromagnetic pole member which defines a clamping surface,
  at least one of said plurality of pole pieces is designed to be associated to a movable pole extension (4),
  said movable pole extension (4) comprising:
    a fixed pole member (5) extending in a predetermined longitudinal direction (X-X) and
    at least two pole members (6, 7) coupled to said fixed pole member (5),
    said at least two pole members (6, 7) being movable relative to said fixed pole member (5),
    holder means (8) operably coupled to said fixed pole member (5), said holder means (8) being movable in said predetermined longitudinal direction (X-X) between a first operating position (P1) and a second operating position (P2) said holder means operating on said at least two movable pole members (6, 7) to hold them in mating contact with said fixed pole member (5),
    wherein said holder means (8) at least partly act as a collector for a magnetic flux generated by said magnetic apparatus (1) and said holder means (8) include a hollow member (9) in slidably mating relationship with said fixed pole member (5), said hollow member (9) being able to hold at least one portion (5A) of said fixed pole member (5) by a form fit between complementary profiles.

12. The movable pole extension as claimed in claim 11, wherein said fixed pole member (5) has at least two planar surfaces inclined to said predetermined longitudinal direction (X-X), said at least two movable pole members (6, 7) being each in slidably mating contact with one respective inclined surface of said fixed pole member.

13. The movable pole extension as claimed in claim 12, where at least two curves surfaces (12, 13) define respective sliding surfaces (12A, 13A) for said at least two movable pole members (6, 7), said respective sliding surfaces (12A, 13A) being oriented in opposite directions.

14. The movable pole extension as claimed in claim 13, wherein each of said respective sliding surfaces (12A, 13A) forms an angle of 40° to 50°, preferably 45°, relative to said predetermined longitudinal direction (X-X).

15. The movable pole extension as claimed in claimed 12, comprising elastic means (17) operating on two movable pole members (6, 7) for holding said at least two movable pole members (6, 7) in contact with said fixed pole member (5).

16. A magnetic clamping apparatus comprising a frame adapted to contain a plurality of pole pieces, each of said plurality of pole pieces having a ferromagnetic pole member which defines a clamping surface, characterized in that at least one of said plurality of pole pieces is designed to be associated to a movable pole extension (4), said movable pole extension (4) comprising:
  a fixed pole member (5) extending in a predetermined longitudinal direction (X-X) and
  at least two pole members (6, 7) coupled to said fixed pole member (5), said at least two pole members (6, 7) being movable relative to said fixed pole member (5),
holder means (8) operably coupled to said fixed pole member (5), wherein said holder means (8):
  are movable in said predetermined longitudinal direction (X-X) between a first operating position (P1) and a second operating position (P2) and
  operate on said at least two movable pole members (6, 7) to hold them in mating contact with said fixed pole member (5).

17. A movable pole extension for a magnetic clamping apparatus (1) for holding a ferromagnetic workpiece (P), comprising:
  a fixed pole member (5) extending in a predetermined longitudinal direction (X-X) and—at least two pole members (6, 7) coupled to said fixed pole member (5), said at least two pole members (6, 7) being movable relative to said fixed pole member (5), holder means (8) operably coupled to said fixed pole member (5), wherein said holder means (8):—are movable in said predetermined longitudinal direction (X-X) between a first operating position (P1) and a second operating position (P2) and—operate on said at least two movable pole members (6, 7) to hold them in mating contact with said fixed pole member (5); wherein said fixed pole member (5) has a receptacle (11) that defines at least two curved surfaces (12, 13) relative to said predetermined longitudinal direction (X-X) and a bottom (14), said at least two movable pole members (6, 7) being each in slidable mating contact with one respective surface of said at least two surfaces (12, 13); wherein said at least two curved surfaces (12, 13) are oriented in opposite directions, converging towards said bottom (14).

18. A removable pole extension for a magnetic clamping apparatus (1) for holding a ferromagnetic workpiece (P), comprising:
    a fixed pole member (5) extending in a predetermined longitudinal direction (X-X) and
    at least two pole members (6, 7) coupled to said fixed pole member (5),
said at least two pole members (6, 7) being movable relative to said fixed pole member (5), holder means (8) operably coupled to said fixed pole member (5),
said holder means (8) being movable in said predetermined longitudinal direction (X-X) between a first operating position (P1) and a second operating position (P2), said holder means operating on said at least two movable pole members (6, 7) to hold them in mating contact with said fixed pole member (5),
    wherein said holder means (8) at least partly act as a collector for a magnetic flux generated by said magnetic apparatus (1) and said holder means (8) include a hollow member (9) in slidably mating relationship with said fixed pole member (5), said hollow member (9) being able to hold at least one portion (5A) of said fixed pole member (5) by a form fit between complementary profiles;
    wherein said at least two movable pole members (6, 7) are each movably in different directions relative to said predetermined longitudinal direction (X-X); and
    wherein said hollow member (9) comprises an end wall (9A) with side walls (9B) extending therefrom in said longitudinal direction (X-X) to contain said at least one portion (5A) of said fixed pole member (5).

* * * * *